United States Patent [19]

Gafert

[11] 4,338,002

[45] Jul. 6, 1982

[54] METHOD OF DETERMINING THE PROPER INDIVIDUALLY GIVEN POSITIONS OF DIOPTRIC PORTIONS ON EYEGLASSES

[76] Inventor: Heinz-Joachim Gafert, Breisacher Str. 46, D-7800 Freiburg i.Br., Fed. Rep. of Germany

[21] Appl. No.: 45,229

[22] Filed: Jun. 4, 1979

[30] Foreign Application Priority Data

Sep. 28, 1978 [DE] Fed. Rep. of Germany ....... 2842133

[51] Int. Cl.³ ............................ A61B 3/00; A61B 3/10
[52] U.S. Cl. .......................................... 351/39; 351/6; 351/13; 351/16
[58] Field of Search ...................... 351/1, 6, 13, 16, 15, 351/39, 5; 362/349; 33/200

[56] References Cited

U.S. PATENT DOCUMENTS

| | | | |
|---|---|---|---|
| 321,020 | 3/1885 | Grimmesey | 362/349 |
| 1,630,281 | 5/1927 | Tillyer | 351/16 |
| 1,877,439 | 9/1932 | Wichart | 351/16 |

FOREIGN PATENT DOCUMENTS 3505 of 1896 United Kingdom ................ 362/349

*Primary Examiner*—John K. Corbin
*Assistant Examiner*—Rodney Bovernick
*Attorney, Agent, or Firm*—Kontler & Grimes

[57] ABSTRACT

The proper individually given positions of dioptric portions on eyeglasses are determined by illuminating the eyes of an examinee by light rays emanating from a source situated at a close-range point to form light-reflection images of the source on the eyes, and by marking the course of each straight line connecting the light source with the respective image, at a distance from the respective eye corresponding to that of the respective eyeglass. The images are observed in a mirror which is planar and circular and surrounds the light source. The marking is achieved by adhering adhesive rings to respective transparent plates which are disposed between the light source and the respective eyes of the examinee at a distance from the latter which corresponds to that of the respective eyeglass. The dioptric portions are then formed on the respective eyeglasses in accordance with the markings on the transparent plates, and the eyeglasses are then mounted in a frame.

5 Claims, 6 Drawing Figures

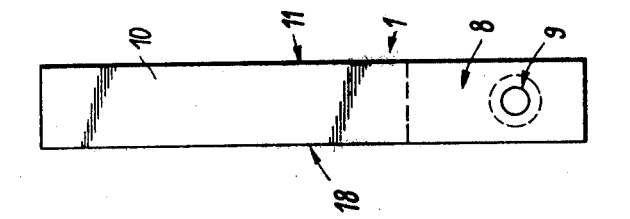
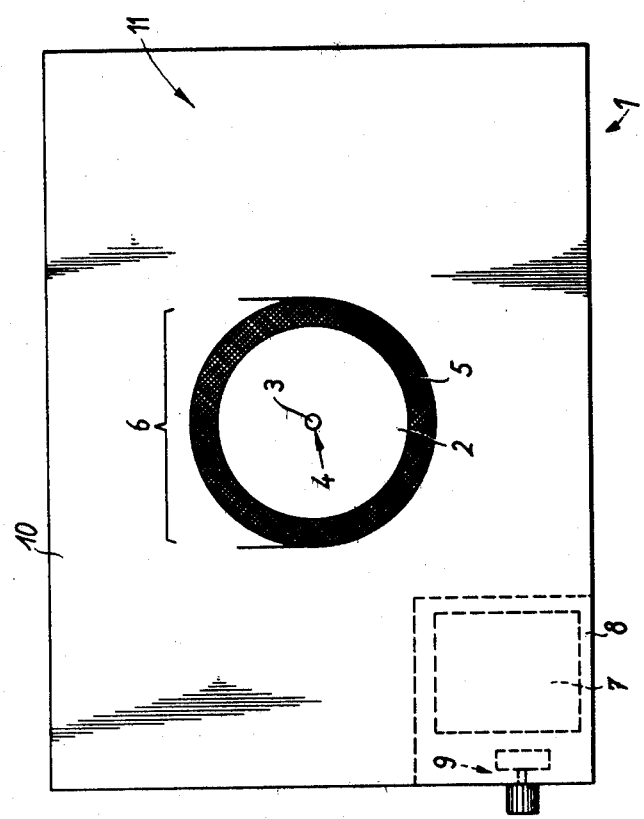
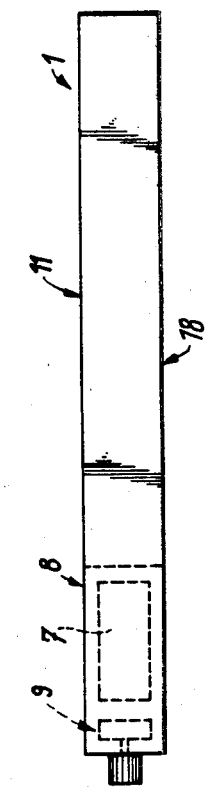

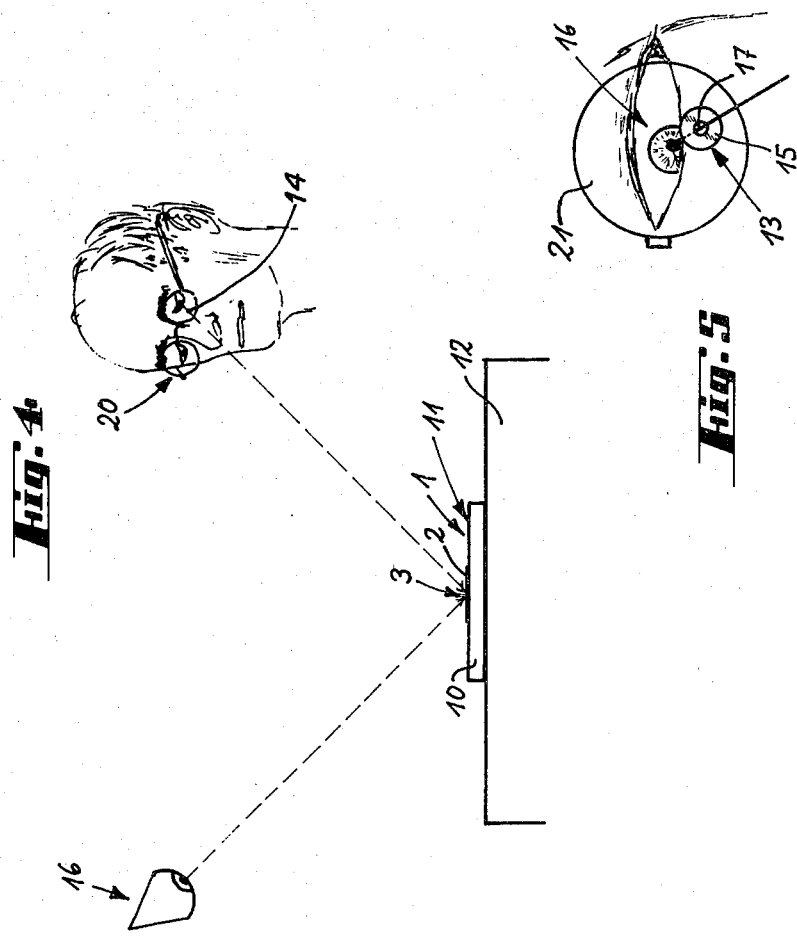

METHOD OF DETERMINING THE PROPER INDIVIDUALLY GIVEN POSITIONS OF DIOPTRIC PORTIONS ON EYEGLASSES

BACKGROUND OF THE INVENTION

The present invention relates to eye-examining methods in general, and more particularly to a method of determining the proper individually given positions of dioptric portions on eyeglasses, especially on pantoscopic eyeglasses for the close-range positions of the eyes of an examinee.

Pantoscopic eyeglasses usually have a relatively small close-range or reading-range regions, such regions having, for instance, a diameter of 6 millimeters.

In the close-range or reading-range position of the eyes, in which the eyes are moved somewhat downwardly and also somewhat inwardly because of the shorter observation distance, the close-range regions should be arranged within the observation direction as exactly as possible. When the close-range region or portion is positioned exactly on the respective eyeglass, the user of the eyeglasses can sharply discern the respective line of writing or print from the beginning of the line to the end thereof during normal sweep of the eyes, provided that the length of the line is within a certain limit which is determined by the size of the close-range dioptric portion and hence by the angle through which the respective eye can move while still looking through the respective close-range dioptic portion. To satisfy the above condition, it must be assured that, as the eyes are moved from side to side while reading the respective line, the points of intersection of the line of direct vision, which moves in accordance with the angular displacement of the respective eye, with the respective eyeglass are still located within the close-range dioptric portion of the respective eyeglass. On the other hand, when the angular displacement of the respective eye is more pronounced, the above-discussed points of intersection become located outside of the close-range dioptric portion so that the user of the eyeglasses sees the script or the like only as a blurred image.

Heretofore, it was resorted to the use of experimental values for determining the positions of the dioptric portions on the pantoscopic eyeglasses in the reading position of the eyes of the examinee. These experimentally obtained values were used to locate the center of the close-range dioptric portion with respect to the center of the far-range portion of the respective eyeglass as a whole. For instance, it was heretofore customary to measure 2.5 millimeters inwardly and 14 millimeters downwardly from the center of the far-range portion of the respective eyeglass to determine the location of the center of the close-range portion of the eyeglass.

This method which is based on experience and on experimentally obtained values is sufficiently accurate when used, for instance, for manufacturing bifocal eyeglasses. This is attributable to the fact that in these bifocal eyeglasses the close-range portion is substantially larger than in pantoscopic eyeglasses. The situation is different for pantoscopic eyeglasses where difficulties are often encountered in view of the fact that it is not possible to establish the proper positions of the close-range dioptric portions with a sufficient degree of accuracy. This is further aggravated by the fact that the proper positions of the close-range dioptric portions vary from one individual to another so that an exact and individual determination of the proper position of the close-range dioptric portions is impossible to achieve by resorting to the use of experimental values.

OBJECTS AND SUMMARY OF THE INVENTION

It is an object of the invention to provide a method by means of which it is possible to obtain an exact determination of the proper individually given positions of the dioptric portions on pantoscopic eyeglasses in the close-range positions of the eyes.

One feature of the present invention resides in the provision of a method of determining the proper individually given positions of dioptric portions on eyeglasses, especially on pantoscopic eyeglasses for the close-range positions of the eyes of an examinee, which method, briefly stated, comprises the steps of illuminating the eyes of the examinee by light rays emanating from a source situated at a close-range point to form light-reflection images of the source on the eyes, and marking the course of each straight line connecting the light source with the respective image, at a distance from the respective eye corresponding to that of the respective eyeglass. Advantageously, a transparent plate is positioned at the aforementioned distance from the respective eye, and the marking is achieved by providing markings (adhesive rings) on the transparent plate at the proper positions of the dioptric portions. Best results are obtained when the respective image is observed in a mirror which is advantageously located around the light source and generally in a common plane therewith. After the proper positions or portions are ascertained in the above-discussed manner, the close-range dioptric portions are formed in the respective eyeglasses in accordance with the markings, and the eyeglasses are mounted in a frame.

As a consequence of the observation of the light-reflection image in the eye of the examinee, there is obtained a target point which can be utilized for determining the exact proper position of the dioptric portion for close-range vision. The observer, more often than not an optometrist, is then able to mark the resulting proper positions on the transparent plates which, for instance, can be constituted by the eyeglasses themselves. The above-mentioned mirror is located between the examiner or observer and the examinee, at the proper reading distance from each of them. The advantage of using the adhesive rings is that, when the rings are properly situated on the transparent plates, the observer must see the light reflections in the eye of the examinee centrally in the openings of the adhesive rings. An especially advantageous and precise direction finding is possible when these adhesive rings are being utilized.

As mentioned before, the eyeglasses are formed with the close-range dioptric portions, preferably by grinding. The close-range dioptric portions are formed in the respective eyeglasses in exact correspondence with the markings of the proper positions on the transparent plates relative to the eyeglass frame, so that the markings and the centers of the close-range dioptric portions register with one another.

The device for performing the above-discussed method includes the above-mentioned mirror which has the light source located within its outline and approximately in the plane of its reflective surface. The light source serves the purpose of producing the light-reflective image in the eye of the examinee, while the mirror is provided for changing the observation angle for the observer, such as an optician, ophthalmologist, optometrist or the like. Advantageously, the mirror is surrounded by a contrasting ring. This ring gives the examinee an optical guidance by means of which a deviation of the eye is avoided to the largest possible extent.

In a currently preferred embodiment, the mirror has a circular outline and the light source is located in the center thereof. The round outline is advantageous especially in view of the generally round field of vision. Advantageously, the device has a flat housing of a box-shaped configuration, and the mirror is provided at the one major surface thereof, the mirror being planar and preferably also flush with this major surface. This construction renders possible especially simple handling of the device.

Another surface of the housing, especially the other major surface thereof, is provided with a vision or reading test chart. This test chart can have at least two lines of alphanumeric characters, each of these lines being of a different length. A final reexamination of the exact position of the close-range portion is made possible by providing this test chart. In this case, the user of the glasses can first read the line of the shortest length, and no blurring of the images must occur either at the beginning or at the end of the line, even though the eyes are being angularly displaced while reading that line. Thereafter, the testing is repeated for the next-following line of a greater length, until finally blurring of the images is encountered at the ends of the respective line for a certain line length. When the close-range dioptric portions of the eyeglasses are situated at the proper positions, the limits of sharp vision must lie symmetrically to the greatest possible extent, that is, the region of blurred images at the respective left or right end of the line must be disposed at approximately the same distance from the beginning or the end of the line. As a rule, a line extending over the entire width of a letter size paper should be sharply seen over its entire length without angular movement of the head of the examinee.

The novel features which are considered as characteristic of the invention are set forth in particular in the appended claims. The improved method itself, however, together with additional features and advantages thereof, will be best understood upon perusal of the following detailed description of certain specific embodiments of a device for the practice of the method with reference to the accompanying drawing.

BRIEF DESCRIPTION OF THE DRAWING

FIG. 1 is a top plan view of the device;
FIG. 2 is a side elevational view of the device of FIG. 1;
FIG. 3 is an end view of the device of FIG. 1;
FIG. 4 is a diagrammatic illustration of the device of FIG. 1 in the position of use thereof;
FIG. 5 is a front view of an eye with an eyeglass as positioned in front of the same and with marking provided thereon.

DESCRIPTION OF THE PREFERRED EMBODIMENTS

Figure 6:
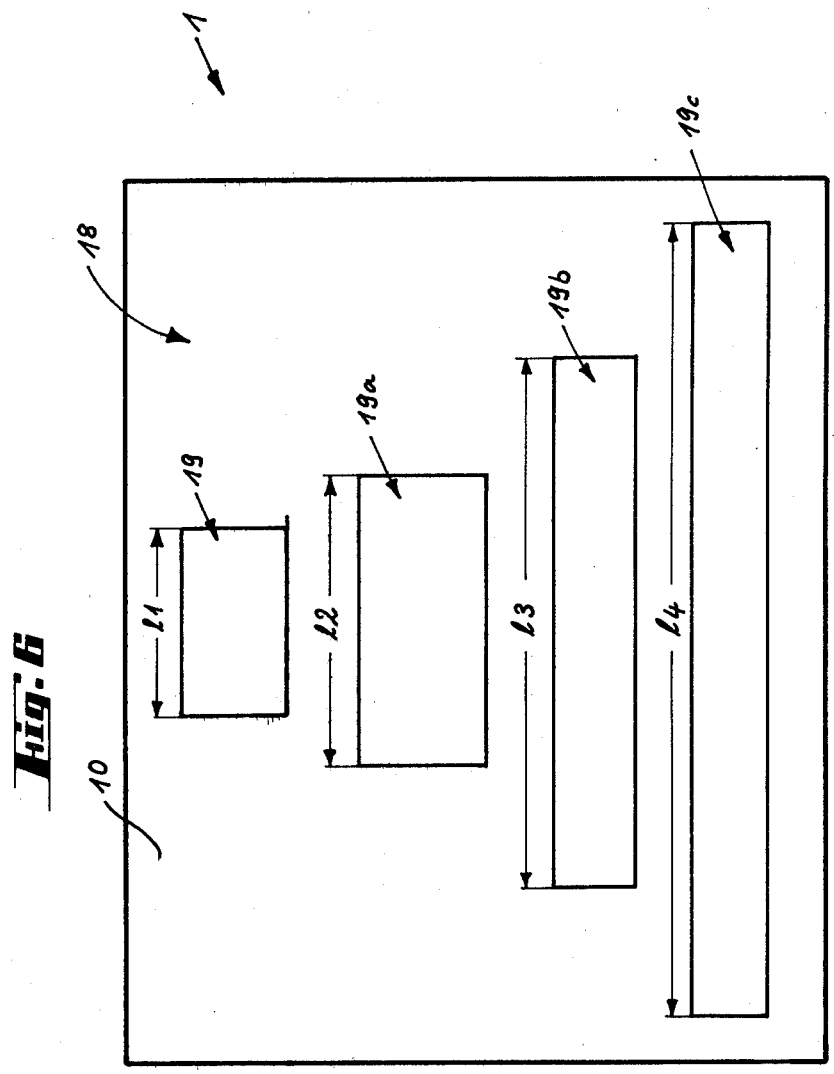
FIG. 6 is a bottom plan view of the device according to FIG. 1 as provided with several reading test fields.

Referring now to the drawing in detail, and first to FIG. 1 thereof, it may be seen that the reference numeral 1 designates a device which serves for the fitting of pantoscopic eyeglasses. More particularly, the device 1 serves for the determination of the proper positions to be assumed on the eyeglasses by dioptric portions for the close-range vision in the position of the eyes of the examinee which corresponds to the observation of objects at close range.

Basically, the device 1 includes a mirror 2 and a light source 3 which is situated within the outline of the mirror 2 and at least approximately in the reflection plane of the mirror 2. The mirror 2 is planar and has a circular outline. Furthermore, the mirror 2 has a central bore 4. As may be seen with particular clarity in FIG. 1, the mirror 2 is surrounded by a contrasting ring 5. This contrasting ring 5 is, for example, coated by a dark, especially low-reflection material, or it can also be constituted in its entirety by such a material.

In accommodation to the size of the field of vision, the mirror 2 has an outer diameter of about 60 to 100 millimeters, preferably of approximately 80 millimeters. The size of the contrast ring 5 is similarly accommodated to the field of vision. The contrasting ring 5 can have, for instance, a radial dimension of approximately 5 to 25 millimeters, preferably of approximately 20 millimeters. The exposed surfaces of the mirror 2 and of the contrasting ring 5 together form a measuring field 6. A battery 7, which is accommodated in a battery compartment 8 of the device 1, serves for supplying electric current to the light source 3.

The intensity of the light emitted by the light source 3 can be varied in dependency on, and to take into account, the varying light conditions in the examination room. A potentiometer 9 which is included in the electric circuit to serve as an adjustable resistor, is being employed for this purpose. As illustrated, especially in FIGS. 1 and 2, the potentiometer 9 is incorporated into the housing of the device 1 in close proximity of the battery commpartment 8.

A flat box-shaped housing 10 serves for the accommodation of the above-mentioned parts of the device 1. The mirror 2 and the contrasting ring 5 are provided at one of the major surfaces of the housing 10, this major surface being referred to as the top surface 11. The mirror 2 and contrast ring 5 are at least substantially flush with the top surface 11. The light source 3 is introduced into the bore 4 from the inside of the housing 10. The light source 3 is substantially flush with the plane of the mirror 2.

The mirror 2 and the contrasting ring 5 are provided approximately centrally of the top surface 11 of the housing 10. When the measuring field 6 is being observed, the outer edges of the housing 10 are located outside the field of vision, provided that the correct dimensions are selected for the housing 10. Thus, these edges are not encompassed within the field of vision so that they do not constitute a disturbing, distracting or otherwise disconcerting factor. It has been established that it is advantageous when the dimensions of the housing 10 are approximately 30 centimeters in length, approximately 23 centimeters in width, and approximately 2.5 centimeters in height. Herein, the height is predominantly determined by the dimensions of the components which are to be accommodated within the housing 10 (battery 7 and so on), while the dimensions of the top surface 11 are basically determined by the consideration that the outer edges of the housing 10 be so located that, during the observation of the measuring field 6, they do not have any disturbing or possibly distracting effects.

For this reason, the mirror 2 is arranged centrally of the top major surface 11 of the housing 10.

Having so discussed the construction of the device 1 as to its main features, the manner in which the device 1 is being used will now be explained.

As indicated in FIG. 4, the device 1 is positioned, with its top surface 11 facing upwardly, on a table, desk or similar support 12. The examiner, be it an ophthalmologist, an optometrist or an optician, and the examinee or patient sit opposite one another across the table 12, and the device 1 is situated between them approximately at the same distance from each of them. The distance from which the mirror 2 is being observed can amount, depending on various considerations, to approximately 400 to 600 millimeters. The examinee can have a pair of eyeglasses 20 or a correspondingly constructed measuring instrument in front of his or her eyes. The measuring instrument may be equipped, for example, with a plate-shaped or sheet-shaped transparent element 14 which is situated frontwardly of the respective eye of the examinee at the same distance as prescription eyeglasses usually are. The above-mentioned transparent element or the like basically serves only as a carrier for a marking which is to be eventually provided thereon. This marking, indicated by the reference numeral 13 in FIG. 5, is first positioned on the measuring glass or a similar transparent element 14 at the position of the close-range dioptric portion where, according to experience, an imaginary line connecting an object to be observed and the respective eye intersects the respective eyeglass when the object is located at close-range or reading position relative to the respective eye and when the latter assumes the position for close-range observation. In FIG. 5, an adhesive ring 15 which surrounds the proper location for the dioptric close-range portion serves as the marking 13 of a point. As established by experience, the point of intersection is, for instance, located at 2.5 millimeters inwardly and 14 millimeters downwardly from the center of the respective eyeglass as a whole and particularly of its far-range vision center.

Thereafter, a test is conducted while the examinee holds his head in a steady position, in order to establish where the measuring field 6 is observed in its entirety by the respective eye of the patient or examinee. Thereafter, the same test is performed for the other eye, while the position of the head of the examinee remains the same.

Subsequently thereto, the examinee concentrates or focuses on the light source 3 which is located in the center of the mirror 2 and the examiner, who is symbolized in FIG. 4 by an eye 16, and who is located at the other side of the table 12, can observe the reflected image of the light source 3 on the cornea of an eye 21 of the examinee in the mirror 2. In the event that, by sheer coincidence, the marking 13 (adhesive ring 15), which has been positioned in accordance with experience, is correctly positioned on the transparent element 14, then the reflected image on the cornea is situated substantially centrally within the adhesive ring 15 as observed from the vantage point of the examiner. When this is not the case, the marking 13 can be shifted or displaced until the exact proper location is indicated thereby.

At this point, the correct and individually fitted position of the see-through portions 17 as pertaining to the respective examinee for the reading position of his or her eyes has been established.

The exact position is then recorded by the examiner and subsequently taken into account when manufacturing the eyeglasses, especially during the fitting of the same in an eyeglass frame. It is to be mentioned at this juncture that the vertical distance of the center of the far-range region from the center of the close-range region is fixed, based on manufacturing considerations. Nevertheless, an exact position or adjustment of the close-range dioptric portion in correspondence with the established see-through portion 17 for the respective examinee can be achieved by, for instance, grinding the outer periphery of the respective eyeglass. As a rule, the fixed distance between the far-range center and the close-range center amounts to 14 millimeters and constitutes the smooth transition region (progressive zone) between the close-range region and the far-range region.

For the purpose of the final testing of the ready-to-use eyeglasses, a bottom surface 18 of the housing 10 which is shown in FIG. 6 is provided with a plurality of alphanumeric fields 19 to 19c. Excerpts of reading materials, for instance, are provided within these fields 19 and 19c, the excerpts having different line lengths. So, for instance, the fields 19 to 19c may have respective lengths of approximately $l_1 = 6.5$ centimeters, $l_2 = 10$ centimeters, $l_3 = 18$ centimeters, and $l_4 = 27$ centimeters. These lengths of the lines are predetermined, for example, by the width of the columns in newspapers or the customary paper formats. So, for instance, the line length of 18 centimeters corresponds to the width of a writing field available for use on a letter-size paper.

During the final testing of the eyeglasses, the examinee reads, while maintaining his or her head in a steady position, and one after the other, first the narrow textual excerpt in the field 19 and then the textual excerpts which become gradually wider, until he or she establishes that blurred images are obtained when the eyes are angularly displaced into certain positions. As a rule, provided that the eyeglasses have been properly fitted, the textual excerpt provided in the field 19b should be perceived as being sharp and clear while the head of the examinee does not move and only the eyes of the examinee sweep from one side to the other while reading the textual material. Commencing at certain line length, blurred images will be perceived at the marginal regions at the beginning and at the end of the respective lines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A method of determining the proper individually given positions of dioptric portions on eyeglasses, especially on pantoscopic eyeglasses for the close-range positions of the eyes of an examinee, comprising the steps of illuminating the eyes of the examinee by light rays emanating from a source situated at a close-range point to form light-reflection images of the source on the eyes; and marking the course of each straight line connecting the light source with the respective image, at a distance from the respective eye corresponding to that of the respective eyeglass.

2. A method as defined in claim 1, further comprising the step of positioning a transparent plate at said distance from the respective eye, and wherein said marking step includes providing markings on the transparent plate.

3. A method as defined in claim 2, wherein said marking step includes adhering adhesive rings to the transparent plate around the positions of the dioptric portions.

4. A method as defined in claim 1, wherein said marking step includes observing the respective image in a mirror.

5. A method of providing dioptric portions at proper individually given positions of eyeglasses, especially of pantoscopic eyeglasses for the close-range portions of the eyes of an examinee, comprising the steps of illuminating the eyes of an examinee by light rays emanating from a source situated at a close range point to form light-reflection images of the source on the eyes; providing markings indicative of the course of each straight line connecting the light source with the respective image, at a distance from the respective eye corresponding to that of the respective eyeglass; forming the dioptric portions in the respective eyeglasses in accordance with the markings; and mounting the eyeglasses in a frame.

* * * * *